3,181,958
REFRACTORY COMPOSITION
Everett A. Thomas, Cincinnati, Ohio, assignor to The Chas. Taylor's Sons Company, Cincinnati, Ohio, a corporation of Ohio
No Drawing. Filed Oct. 20, 1961, Ser. No. 146,446
8 Claims. (Cl. 106—57)

The present invention relates to a new and novel refractory composition and more particularly to a ceramic composition which is especially suitable for use wherein it comes in contact with molten glass.

The refractory composition of the present invention is designed for use primarily as contact blocks in the construction of furnaces utilized for melting borosilicate glasses in the production of glass fibers.

Refractories presently employed for this purpose consist mainly of dense zircon and dense chromic oxide. Corrosion presents a major problem in this application and it has been found that chromic oxide has a corrosion resistance which is approximately eight times better than that of dense zircon when in contact with a low-alkali-lime-alumina borosilicate glass. The dense zircon type refractory does not have the desired corrosion resistance for long service life, and while the chromic oxide does have good corrosion resistance to borosilicate glass, it is very expensive and is subject to high vapor loss and thermal cracking during service.

It has been known for some time that chromic oxide is very refractory and chemically inert to acid and basic slags and glasses. Accordingly, chromic oxide has been used in combination with various refractory oxides to provide a refractory composition having good slag resistance. Due to the high refractoriness of chromic oxide, its addition to other refractory materials generally results in a body of increased porosity.

This increase in porosity is usually objectionable when the refractory composition is used in contact with molten glass due to the glass penetration of the refractory structure and resultant contamination of the glass by chromic oxide. Slight traces of chromic oxide will impart an undesirable greenish color to the glass. In addition, due to the low solubility of chromic oxide in most glasses, crystalization of chromic oxide as refractory stones often occurs in glasses which have been contaminated with excess amounts of chromic oxide. These stones cause serious defects in glass fibers resulting in breakage of the fiber. Accordingly, in order to prevent a refractory containing chromic oxide from being a source of color contamination and refractory stones, it is necessary that the refractory body be of low porosity and dense structure to resist glass penetration.

The present invention is directed to a refractory composition which has low porosity and which possesses superior corrosion resistance to molten glasses as compared to the refractory compositions presently in use. It has been found that the refractory composition of the present invention has a corrosion resistance about two times better than that of dense zircon. The refractory composition of the present invention also has better resistance to thermal cracking and vapor loss than chromic oxide type refractories now in use. Accordingly, the use of the refractory composition according to the present invention in critical areas of a furnace will help to prolong the service life of the furnace.

An object of the present invention is to provide a new and novel refractory composition of low porosity and which has high resistance to glass penetration and interfacial reaction when employed with molten glass.

Another object of the invention is the provision of a refractory composition which possesses superior corrosion resistance to molten glass than dense zircon bodies now commonly used as glass contact refractories for borosilicate glasses.

Other objects and many attendant advantages of the invention will become more apparent when considered in connection with the following specification:

The present invention is predicated upon the discovery that a low porosity refractory with superior corrosion resistance characteristics to molten glass may be obtained by providing a composition which, exclusive of impurities, comprises zircon and chromic oxide combined within certain limits and to which is added a small, but effective, amount of titanium dioxide within ranges as hereinafter established. The addition of titanium dioxide is effective in reducing the apparent porosity of zircon-chromic oxide compositions over the range comprising a major proportion of zircon and a minor proportion of chromic oxide. More specifically the instant invention is directed to a refractory composition wherein the zircon represents between about 90 percent and about 60 percent by weight of the composition, chromic oxide represents between about 10 percent and about 40 percent by weight of the composition and titanium dioxide represents about at least 0.5 percent by weight of the composition. In practice it has been found feasible to employ an amount of titanium dioxide up to and including about 5 percent by weight of the composition depending upon the relative proportions of the other two components. It has been observed that, as the amount of $TiO_2$ is increased, the resistance to thermal shock and to corrosion tends to decrease, and this observation should be kept in mind when choosing the final composition to be employed for any particular situation.

The apparent porosity of the refractory composition may be used as a convenient measure of the usefulness of the composition for the purposes referred to herein. In general, it has been found that the apparent porosity of the composition should be something less than 15 percent and preferably within the range of one percent or less to about three percent.

It may be said, as a general guide, that when employing approximately 60 percent zircon and 40 percent chromic oxide one should, for best results, use somewhat over one percent $TiO_2$ and probably an amount approaching 2½–3%. When employing about 70 percent zircon and about 30 percent chromic oxide one should employ between about one percent and two and one-half percent $TiO_2$. When employing about 80 percent zircon and about 20 percent chromic oxide one should employ about 0.5 percent to one percent $TiO_2$. When employing about 90 percent zircon and 10 percent chromic oxide, one should use from about 0.5 percent to about 0.75 percent $TiO_2$. From the foregoing it is evident that as the percentage of chromic oxide is increased, it is also generally necessary to add a higher percentage of $TiO_2$.

Referring now to Table I, examples of compositions satisfactory for use in accordance with the instant invention are presented. The apparent porosity of these mixes is also given as well as the bulk density. The bulk density figures may be conveniently employed as a check on the apparent porosity, since as is indicated the bulk density figure tends to increase as the apparent porosity figure tends to decrease through any given range of compositions. In addition, Table I includes representative compositions consisting essentially of zircon and chromic oxide in various proportions but containing no $TiO_2$. These figures are shown for comparative purposes in order to more clearly define the effect of adding small increments of titanium dioxide.

In preparing the compositions shown in Table I chromic oxide was combined with finely milled zircon and titanium dioxide and the mixes slip cast into a test block and fired to cone 20. In some cases the materials were mixed with a small proportion of a commercial de-flocculating agent such as Darvan #7, produced by the R. T. Vanderbilt Company, New York, New York, and sufficient water as added to obtain a flowable mix.

The mix was then cast into plaster molds in the usual manner common to ceramic processes. It has been found that for best results the zircon should be milled to a particle size finer than 15 microns and the chromic oxide to a fineness of less than 10 microns. It is preferred to use rutile milled to less than 45 microns as a source of titanium dioxide, although other grades of titanium dioxide having an equivalent fineness are acceptable.

TABLE I

*Physical data on compositions after firing to cone 20 (1564° C.)*

| Composition | Zircon | Chromic-Oxide | TiO$_2$ | Apparent Porosity | Bulk Density |
|---|---|---|---|---|---|
| A | 100 | | | 14.3 | 3.78 |
| B | 90 | 10 | | 20.8 | 3.48 |
| C | 89.325 | 9.925 | 0.75 | 0.0 | 4.19 |
| D | 84.36 | 14.88 | 0.75 | 0.3 | 4.07 |
| E | 80 | 20 | | 23.0 | 3.42 |
| F | 79.6 | 19.9 | 0.5 | 9.5 | 3.99 |
| G | 79.4 | 19.85 | 0.75 | 0.25 | 4.31 |
| H | 79.2 | 19.8 | 1.0 | 0.02 | 4.33 |
| I | 78.0 | 19.5 | 2.5 | 0.1 | 4.28 |
| J | 76.0 | 19.0 | 5.0 | 2.2 | 4.13 |
| K | 70 | 30 | | 29.5 | 3.20 |
| L | 68.78 | 29.47 | 1.75 | 2.0 | 4.01 |
| M | 60 | 40 | | 30.4 | 3.16 |
| N | 59.7 | 39.8 | 0.5 | 19.2 | 3.69 |
| O | 59.4 | 39.6 | 1.0 | 12.8 | 3.93 |
| P | 58.5 | 39.0 | 2.5 | 0.8 | 4.33 |
| Q | 57.0 | 38.0 | 5.0 | 0.6 | 4.39 |
| R | 50 | 50 | | 34.8 | 2.99 |
| S | 48.75 | 48.75 | 1.75 | 14.1 | 3.85 |
| T | 40 | 60 | | 38.4 | 2.90 |
| U | 39.6 | 59.4 | 1.0 | 29.1 | 3.32 |
| V | 39.0 | 58.5 | 2.5 | 20.9 | 3.70 |
| W | 38.0 | 57.0 | 5.0 | 20.7 | 3.74 |
| X | | 100 | | 50.8 | 2.53 |

As seen in Table I, the apparent porosity increased from about 14 percent for the pure zircon body of Composition A to about 50 percent for the pure chromic oxide body of Composition X. Further it will be noted from a study of the table that the addition of titanium dioxide in amount of at least about 0.5 percent by weight of the composition and generally in the range of about 0.5 percent to about 5 percent is effective in reducing the apparent porosity within the ranges hereinbefore set forth.

Referring now to Table II, the amount of corrosion of the various compositions is tabulated. Test blocks 2½" by 4½" by 4½" were cast from the compositions as shown in the different examples of Table I and fired to cone 20. These test blocks were then used to line the melter area of a corrosion test furnace. The furnace was heated to 1566° C. and held at this temperature for 300 hours during which time borosilicate glass marbles were charged at the rate of one pound per hour. The depth of the glass was held at three inches during the test with excess glass being drained off. After the completion of the test the furnace was drained and the test blocks measured for depth of corrosion and glass penetration. The depth of cut at the metal line was used as a measure of corrosion. By dividing this dimension by 300 hours, the rate of cut of inches per hour is obtained. It will be noted from an inspection of Table II that the rate of corrosion generally decreases with an increase in chromic oxide content of the composition.

TABLE II

*Corrosion data in borosilicate glass at 1566° C.*

| Composition | ZrSiO$_4$ (percent) | Cr$_2$O$_3$ (percent) | TiO$_2$ (percent) | Rate of Corrosion, inches/hour | Depth of Penetration, inches |
|---|---|---|---|---|---|
| A | 100 | | | .0016 | 1 |
| C | 89.325 | 9.925 | 0.75 | .0015 | a1 |
| D | 84.36 | 14.88 | 0.75 | .0011 | a1 |
| G | 79.4 | 19.85 | 0.75 | .0008 | a1 |
| L | 68.78 | 29.47 | 1.75 | .0007 | a1 |
| P | 58.50 | 39.00 | 2.5 | .0006 | 0.75 |
| S | 48.75 | 48.75 | 1.75 | .0003 | 1.50 |
| V | 39.00 | 58.5 | 2.50 | .0001 | 2.0 | a No observable penetration.

Further study of Table II indicates that Compositions C, D, G, and L which are representative of useful refractory mixes within the intent of this application did not show any observable penetration. Compositions P, S, and V showed increasing evidence of glass penetration and formation of a spongy reaction interface which is undesirable for the purpose intended herein.

It is apparent from the foregoing that there is provided a new and novel refractory composition composed mainly of zircon and a lesser amount of chromic oxide which has low porosity and is more resistant to glass penetration and interfacial reaction than compositions higher in chromic oxide content which are of a more porous nature. The composition of the present invention also possesses superior corrosion resistance to molten borosilicate glasses than dense zircon bodies now commonly used for these purposes.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A slip cast and fired refractory article consisting essentially of between about 90 percent and about 60 percent zircon, between about 10 percent and about 40 percent chromic oxide, and between about 0.5 percent and about 5 percent titanium dioxide, the percentages being by weight of the composition, the particle size of said materials being less than about 45 microns.

2. A slip cast and fired refractory article consisting essentially of 89.325 percent zircon by weight of the composition, 9.925 percent chromic oxide by weight of the composition, and 0.75 percent titanium dioxide by weight of the composition, the particle size of said materials being less than about 45 microns.

3. A slip cast and fired refractory article consisting essentially of 84.36 percent zircon by weight of the composition, 14.88 percent chromic oxide by weight of the composition, and 0.75 percent titanium dioxide by weight of the composition, the particle size of said materials being less than about 45 microns.

4. A slip cast and fired refractory article consisting essentially of approximately 79.4 percent zircon by weight of the composition, 19.85 percent chromic oxide by weight of the composition, and 0.75 percent titanium dioxide by weight of the composition, the particle size of said materials being less than about 45 microns.

5. A slip cast and fired refractory article consisting essentially of approximately 68.78 percent zircon by weight of the composition, 29.47 percent chromic oxide by weight of the composition, and 1.75 percent titanium dioxide by weight of the composition, the particle size of said materials being less than about 45 microns.

6. A refractory article according to claim 1 wherein the chromic oxide is of a fineness less than 10 microns, the zircon is of a particle size finer than 15 microns, and the titanium dioxide is of a fineness of less than 45 microns.

7. A method of making a refractory body for improved corrosion resistance when used in contact with molten glass including the steps of forming a slip consisting essentially of between about 90 percent and about 60 percent zircon, between about 10 percent and about 40 percent chromic oxide and between about 0.5 percent and about 5 percent titanium dioxide by weight of the composition, the particle size of said materials being less than about 45 microns, casting the slip to form a shaped body, and firing the body to about cone 20.

8. An article according to claim 1, wherein the amount of titanium dioxide increases as the weight ratio of the zircon to chromic oxide approaches 1:1.

References Cited by the Examiner
UNITED STATES PATENTS 2,271,368 1/42 Rulcher et al. _____ 106—57
2,842,447 7/58 Schlotzhauer et al. _____ 106—57

TOBIAS E. LEVOW, *Primary Examiner.*
JOHN H. MACK, *Examiner.*